United States Patent [19]
Cantz

[11] 3,741,270
[45] June 26, 1973

[54] TIRE STUD
[75] Inventor: Rolf J. Cantz, Grove City, Pa.
[73] Assignee: Kennametal Inc., Latrobe, Pa.
[22] Filed: Mar. 2, 1971
[21] Appl. No.: 120,210

[52] U.S. Cl. ............................................. 152/210
[51] Int. Cl. ............................................. B60c 11/16
[58] Field of Search ..................................... 152/210

[56] References Cited
UNITED STATES PATENTS
3,230,997   1/1966   Carlstedt............................ 152/210
935,331   9/1909   Stimpson ........................... 152/210
FOREIGN PATENTS OR APPLICATIONS
1,927,144   7/1968   Germany ........................... 152/210

*Primary Examiner*—James B. Marbert
*Attorney*—Melvin A. Crosby

[57] ABSTRACT

The specification discloses a tire stud having a body with a hard wear resistant pin mounted an axial bore in the body thereof and protruding from one end of the body. The body has a head on the other end and is mounted in the tread of a tire head end foremost with the end of the stud from which the pin protrudes about at the level of the surface of the tire tread or projecting slightly therefrom. The stud according to the present invention is particularly characterized in that the pin moves axially into the stud body as the stud wears thereby controlling the amount of the pin of the stud which protrudes from the end of the stud body. The bore in the stud body in which the pin is seated has a portion at the pin end with a first taper, an intermediate portion with a second and smaller taper and a final portion with substantially no taper.

8 Claims, 4 Drawing Figures

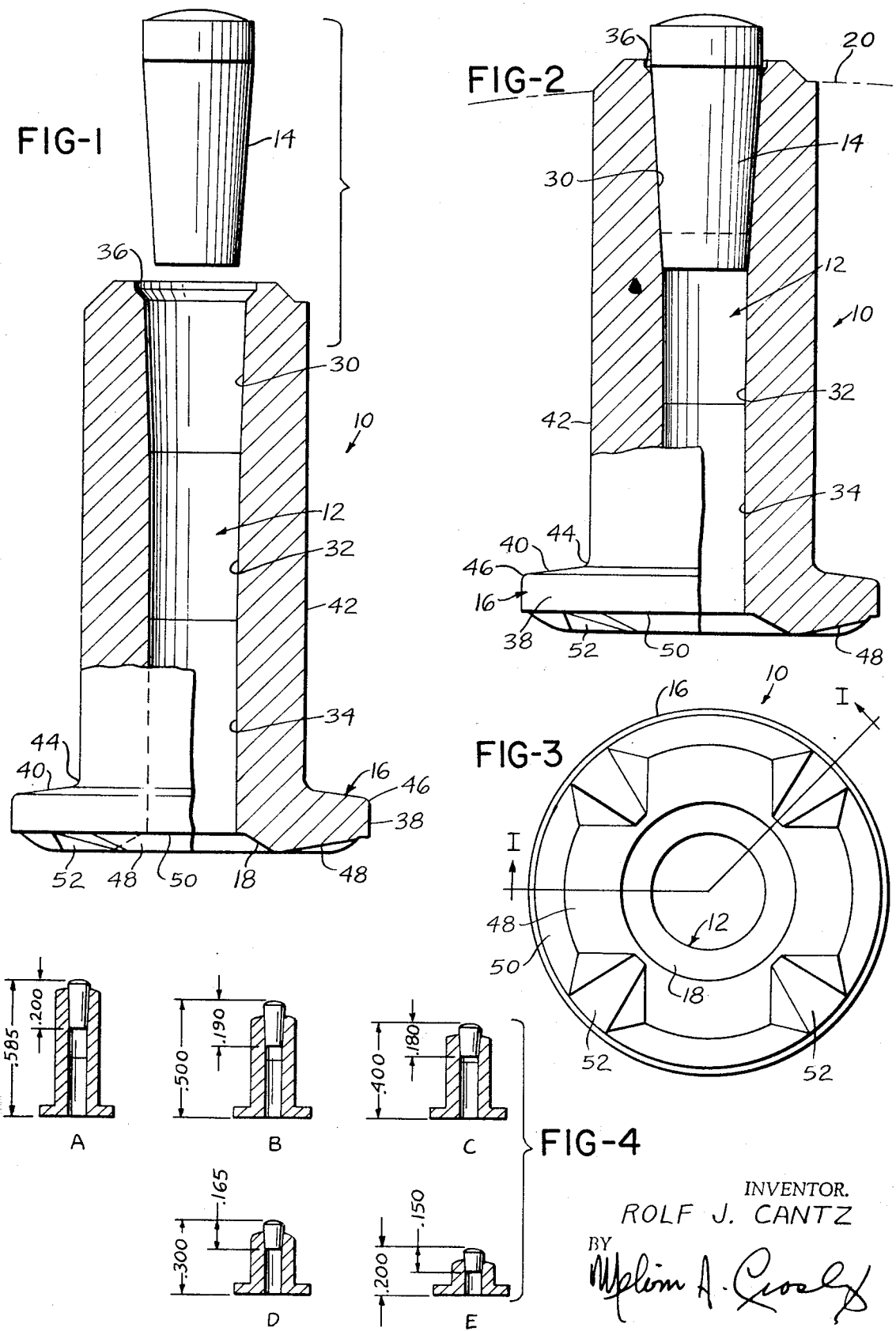

3,741,270

TIRE STUD

RELATED APPLICATION

U.S. application Ser. No. 85,097, filed Oct. 29, 1970.

The present invention relates to tire studs and is particularly concerned with tire studs in which the protrusion of the hard pin from the outer end of the tire stud body is controlled so as to remain substantially constant throughout the life of the tire.

Tire studs are well known and the most popular type currently used comprises a stud body in the form of a cylinder having a single head on one end and having a hard wear resistant pin mounted on the axis of the stud body and protruding a short distance therefrom at the end opposite the head. The studs vary in size and the hard wear resistant pin is usually on the order of about half the length of the stud or a little more.

Studs of the nature referred to above are inserted, head end foremost, in blind holes provided therefor in tire treads so that the pin end of the stud projects a short distance outwardly from the surface of the tire tread whereby the end of the stud will engage the surface on which the tire rolls. Such studs are employed for increasing the traction of tires on slippery surfaces such as snow and ice and are highly effective for this purpose.

Certain problems present themselves in connection with use of tire studs in tire treads, however, that can, on occasion, become extremely troublesome. The bodies of the studs are generally made of metal, either solid metal or sintered from a metal powder, or from a relatively strong plastic, preferably reinforced, as by glass fibers. The pins in the studs, in order to be sufficiently wear resistant, are formed of a cemented metal carbide such as a tungsten carbide or a titanium carbide composition or a mixture of various hard carbides.

Heretofore, the hard pins have been compounded to have about the same wear rate as the rubber-like material of the tire tread in which they were mounted so as to maintain substantially the same protrusion of the pin end of the stud from the tire tread throughout the life of the tire and stud.

The compounding of the material of the pin to match the wear rate of the tread material of the tire has always been difficult and it is always possible for the stud to be installed in a tire having tread material different from that for which the stud was designed. This is particularly the case because substantially all studs are installed in retail outlets at the point of purchase of the tire in which they are mounted and by tire recappers and the like.

When the wear rate of a tire stud pin does not match the wear rate of the tread material of the tire, either the pin wears off too rapidly and the protrusion of the stud is lost and the stud becomes less effective, or the tire tread material wears more rapidly than the pin and the protrusion of the stud increases thereby leading to disadvantageous conditions.

More specifically, the disadvantageous conditions referred to are that, with too great protrusion of the stud from the tread, the stud will be deflected as the tire rolls on a roadway thus tending to loosen the stud in the tire tread and also causing slipping of the pin on the roadway thereby developing heat in the stud and also causing road wear.

Furthermore, when a stud protrudes excessively from a tire tread, the traction of the tire on a clean dry road surface is reduced over what it would be if the studs had the correct amount of protrusion and remained upright in the tire tread. Further, the studs make more noise in operation when protruding an excessive amount from the tire tread.

Still further, when the protrusion of the stud from the tire increases to the point that the stud tends to deflect when the tire hits the roadway, the stud can have appreciably less gripping power on the surface which it engages than if the stud were upright in the tire and, therefore, presented endwise to the surface.

With the foregoing in mind, a primary objective of the present invention is a construction for a tire stud of the nature referred to in which the proper amount of protrusion of the pin from the outer end of the stud body is maintained throughout the life of the stud.

Another object of the present invention is the provision of a tire stud of the nature referred to which reduces road wear caused by the stud.

A still further object is the provision of a tire stud of the nature referred to which runs cooler in operation than heretofore known studs.

A still further object of the invention is the provision of a tire stud of the nature referred to which runs more quietly in operation.

It is also an object of the present invention to provide a tire stud of the nature referred to which permits a greater latitude in the selection of the carbide used for the pin in the stud and which permits the use of a smaller amount of carbide.

These and other objects and advantages of the present invention will become more apparent upon reference to the following detailed specification taken in connection with the accompanying drawings in which:

FIG. 1 shows a tire stud pin and tire stud body, the latter being in cross section, prior to insertion of the pin into the body;

FIG. 2 shows the tire stud with the pin assembled with the body and with the latter in section;

FIG. 3 is an end view of the tire stud looking in at the head end thereof; and

FIG. 4 shows a tire stud according to the invention at various stages in the life thereof.

BRIEF SUMMARY OF THE INVENTION

The present invention is concerned with a tire stud arrangement in which a hard wear resistant pin is mounted in a body which is, in turn, mounted in a tire tread with the pin projecting from the tire tread surface.

A feature of the invention is that of the pin moving axially into the stud body as the tire tread and stud body gradually wear down in use, as disclosed in my prior U.S. Pat. application Ser. No. 85,097, filed Oct. 29, 1970, and assigned to the same assignee as the present application.

The pin may wear down simultaneously with the tire tread and stud body but at a reduced rate, or the pin may be made of sufficient hardness that the wear thereon is diminished substantially to zero. The pin is tapered inwardly toward the bottom and the bore in the stud body is tapered at a decreasing angle starting at the pin end of the bore.

DETAILED DESCRIPTION

Referring to the drawings somewhat more in detail, in FIG. 1, the stud illustrated comprises a body 10 having a central through bore 12. A hard wear resistant pin 14 is provided which is to be mounted in bore 12 at one end. Body 10 at the end opposite the end in which the pin 14 is mounted comprises a single radial flange 16 forming the head of the stud.

The bore 12 at the head end thereof may be provided with a flared portion 18 of selected diameter and degree of taper and which is of importance in that it provides space into which the material of a tire tread can be displaced when the stud is pressed radially inwardly in the tire tread as the tire in which the stud is mounted rolls on a roadway.

As is known, the studs are inserted head end foremost into blind holes provided in the tire tread, the holes being substantially smaller in diameter than the stud body and the studs being inserted into the holes with the stud heads resting on the bottoms of the holes and with at least the outer end of the pin portion of the stud projecting outwardly from the tread surface. In FIG. 2, which shows the tire stud assembled, the surface of a tire tread in which the stud is mounted is indicated by the dashed line 20.

It is of importance for the outer end of pin 14 to maintain about the same protrusion from the tread surface throughout the life of the tire and stud. The tread material of the tire has a certain wear rate and the material of the body of the stud is selected so that the wear rate thereof is at least as great as that of the tread material. The relationship between the outer end of the stud body and the surface of the tread of the tire thus remains substantially constant throughout the life of the tire and stud.

The pin 14, however, is formed of hard cemented carbide material such as cemented tungsten carbide or cemented titanium carbide, or a mixture of carbides, and is extremely hard. The pin can be compounded by selecting the type of binder metal, usually cobalt, or nickel, or a mixture thereof, and the percentage of the binder metal that is admixed with the carbides is selected to provide for a wear rate substantially matching that of the tire tread. The difficulty of matching the studs to the tire tread material in practice, however, prevents such selection of the wear rate of the carbide pin from being effective.

The studs are usually put into the tires at retail outlets, or by retreaders, and the wear rates of the tire tread materials vary widely and the matching of the stud pins with the tread material is thus very difficult to accomplish in practice.

When the wear rate of the pins is not matched with the wear rate of the treat material, the pins either wear off too rapidly, thereby permitting the studs to become ineffective, or the pins wear off too slowly thereby leading to excessive protrusion of the pins from the tire tread. Excess protrusion leads to noisy operation of the studs, insufficient gripping power of the studs on the road surface because of tilting of the studs in the tire tread, the generation of excessive heat in the studs due to slipping of the pins on the road surface as the studs deflect when presented to the road surface, and loosening of the studs in the tread material due to deflection of the studs as they strike the roadway and due to deterioration of the tread material because of the heat developed in the studs.

The stud according to the present invention avoids conditions of excessive protrusion of the pin from the tire tread, even where the wear rate of the pin is less than that of the tire tread, by permitting the pin to move axially into the stud body in a controlled manner as the tire tread and stud body wear away.

By this expedient, the necessity of close matching of the rate of wear of the stud pin to that of the tread material is eliminated and the studs will remain more effective in use and road wear will be reduced while, furthermore, less material is required for the pins and the material of the pins can be almost entirely used up thereby representing a substantial economy.

In FIGS. 1 and 2, the stud body 10 is formed of metal, such as a sintered powdered metal—iron, for example,—or the body can be formed of reinforced plastic material, for example, a plastic material reinforced by glass fibers or the like. Plastic materials such as Delrin or a polycarbonate or other known plastic materials resistant to elevated temperatures and sufficiently tough to withstand the impacting of the studs on a road surface can be employed.

With such a stud body, the pin 14 is formed to a taper with an included angle between the opposite sides thereof of about 8 degrees. Tapered pins are known in connection with tire studs and permit assembling of the pins in the stud bodies without the use of cement or brazing because the studs can be pressed into the bore in the stud body small end foremost and will wedge therein with an interference fit and will hold in the stud body throughout the life thereof.

Heretofore, however, it has not been contemplated that the pin will move in the stud body as the stud wears down and thus the tapering of the pin has been provided merely for the purpose of facilitating assembly of the pin with the stud body and eliminating the cost and labor involved in connection with a cementing or brazing operation. A tire stud embodying a tapered pin therein is illustrated and claimed in the U.S. Carlstedt Pat. No. 3,230,997, assigned to the same assignee as the instant application.

It will be apparent that when the pin and stud are first assembled, as in FIG. 2, there is a maximum length of pin engaged by the stud body. For example, the pin 14, which may be about 0.100 to 0.102 inches in diameter at the larger end, has about 0.040 to 0.060 inches thereof, preferably, the smaller amount, protruding from the outer end of the stud body and about 0.160 to 0.180 inches thereof located within the stud body. The total length of the pin is thus about 0.220 inches which is substantially shorter than it has been possible to make pins heretofore, for the pins to remain effective throughout the life of the tire and stud.

As the stud body wears down with the tread material, the amount of the pin which is gripped by the stud body is reduced and thus the force required to move the pin inwardly into the stud body is also reduced. It is preferable for the pin to be so compounded as also to wear down somewhat in use, but at a rate substantially less than the rate of wear of the stud body and the tire tread material. The pin can, thus, be compounded to be hard and to withstand impacting on the road surface instead of being compounded for a certain wear rate.

The tire in rolling on a roadway will bring a stud properly mounted therein into engagement with the roadway so that an impact is delivered on the outer end of the pin of the stud. As long as the stud remains substantially radial in the tire, the impact on the stud as the tire rolls on the roadway is delivered in the axial direction thereof on the outer end of the stud pin.

The exact amount of this impact is not known, but is believed to be on the order of 60 to 80 pounds, and will, of course, vary with the speed of rotation of the tire and other factors.

Further, the entire stud will tend to move radially into the tire when the outer end of the stud impacts against the roadway and with the resistance to inward movement of the stud into the tire being at least partially under the control of the flared region 18 at the inner end of the central bore in the stud body.

As mentioned, the exact amount of the impact on the outer end of the pin is not known, but it is sufficient to cause inward movement of the pin into the stud body when the stud body wears down at the outer end while maintaining the protrusion of the pin from the outer end of the stud body substantially constant.

FIG. 4 more or less schematically illustrates the appearance of a stud according to the present invention at various stages in the life thereof. The view at the left side of FIG. 4 shows the stud newly assembled and progressive stages in the wear thereof are shown toward the right. For identification, the various stages are identified by capital letters A through E with A representing the new stud and E representing the stud when it is substantially completely worn away.

At stage E, when the stud and tire are about used up, the stud is moved inwardly the distance of about 0.235 inches.

It will be appreciated that the inward movement of the pin into the stud body permits the pin to be made substantially shorter than has heretofore been possible and likewise permits the use of harder material in the pin than has heretofore been possible.

Furthermore, the rate of wear of the pin need no longer be matched to the rate of wear of the tire tread but the pin will, rather, automatically adjust in the stud body to have the proper amount of protrusion. The studs with inwardly migrating pin according to the present invention do not protrude excessively from the tire tread and thus do not tilt in the tire and thereby slip excessively on the road surface, and thereby do not wear the road surfaces as rapidly as conventional studs while, simultaneously, less heat is developed in the stud body thus preventing the studs from becoming loose in the tire tread due to deterioration of the tread material.

Still further, the studs remain upright in the tire and are always presented endwise to the road surface and thus operate efficiently throughout the life of the tire and tread and are substantially more quiet in operation than studs with excessive protrusion from the tire tread.

In the stud arrangement shown in the previously filed application above identified, the central bore in the tire stud body was formed straight, or to a certain taper end to end, or was provided with flutes varying uniformly from end to end of the stud body.

It has been found, in practice, however, that the operation of the stud is considerably improved if the bore in the stud body is caused to taper in a variable manner from the pin end of the stud to the head end thereof. More specifically, as shown in FIG. 1, the bore in the stud body is formed to have a portion 30 at the pin end which is formed to have an included angle between the opposite sides of the bore of about 3 degrees followed by an intermediate portion 32 formed to an included angle between the opposite sides of the bore at about 2.3 degrees and a final portion 34 which is substantially cylindrical down to the flared region 18 at the head end of the bore.

Advantageously, the extreme pin end of the bore has a rather short counterbored portion at 36 which facilitates in inserting the pin into the bore in the stud body.

Advantageously, the diameter of the stud bore at the juncture of portions 30 and 32 thereof is about 0.078 inches for a given type stud with the small diameter of the pin inserted into the bore being about 0.077 inches in diameter. The diameter at the larger end of the pin is about 0.100 to 0.102 inches whereas the larger end of the portion 30 of the bore in the stud body is about 0.88 inches.

It will be evident that when the pin is pressed into the bore in the stud body, it seats therein with an interference fit with a minor portion of the small end of the pin providing a slight lead or pilot portion so that the pin will enter portion 32 of the bore in a proper manner and move on downwardly in the bore as the stud is run on a roadway.

The head end of the stud will be seen in FIGS. 1 and 2 to comprise a relatively short cylindrical portion 38 which, on the pin side thereof, inclines upwardly slightly as at 40 toward the shank 42 of the stud body and merges therewith as by radius 44. The juncture of inclined portion 40 and the outer periphery of portion 38 is likewise joined by a radius 46. On the underside of the head, and which is the side which engages the bottom of a blind hole in a tire tread, the stud head will be seen, particularly in FIG. 3, to have the central flared portion 18 which is surrounded by a region 48 which inclines upwardly toward the pin end of the stud and is, in turn, surrounded by a flat annular region 50.

Advantageously, ribs 52 are provided upstanding about the head in circumferentially spaced relation to inhibit rotation of the stud in the tread material of the tire in which it is mounted.

What is claimed is:

1. In a tire stud in which the protrusion thereof from the tread of a tire in which the stud is mounted remains substantially constant throughout the life of the tire tread and stud; a body comprising a shank with a flange at one end forming a head and an axial bore extending into said shank from the other end, said body being adapted to be mounted in a blind hole in a tire tread head end foremost with the head resting on the bottom of the hole and with the other end of the shank substantially flush with the tire tread, a hard wear resistant pin which tapers at an included angle of about 8 degrees press fitted small end foremost with an interference fit into said bore at said other end of said shank with a predetermined axial length of the pin protruding from said bore, said body being formed of a material substantially more ductile than the material from which said pin is formed, said bore comprising a first portion extending from said other end of the shank toward said one end thereof and tapering inwardly at an included angle of about 3 degrees toward said one end of said shank, said bore comprising a second portion following said first portion and tapering inwardly toward said one end of said shank at a smaller included angle than said first portion of said bore, said portions of said bore being the same diameter at the juncture thereof, the length of said pin being not more than about half the length of said bore, the force required to press said pin into said bore until said predetermined axial length of said pin protrudes from the outer end of said body being about equal to the force developed on the pin by engagement thereof with a roadway on which the tire in which the stud is mounted rolls whereby, as said other end of said shank wears down, the said pin will migrate axially inwardly into said bore and maintain a substantially constant protrusion therefrom.

2. A tire stud according to claim 1 in which said bore comprises a third portion following said second portion and extending to said one end of said shank and being substantially cylindrical.

3. A tire stud according to claim 1 which includes a tapered recess extending into said shank at said one end thereof.

4. A tire stud according to claim 1 in which said pin at the small end is about the same diameter as the juncture of said first and second portions of said bore.

5. A tire stud according to claim 1 in which said second portion of said bore tapers at an included angle of about 2.3 degrees.

6. A tire stud according to claim 1 in which said body is formed of sintered metal powder.

7. A tire stud according to claim 1 in which said pin comprises cemented metal carbide.

8. A tire stud according to claim 1 in which said first and second portions of said bore are about equal in length and each is about as long as said pin.

* * * * *